United States Patent [19]
Sharples

[11] Patent Number: 5,642,725
[45] Date of Patent: Jul. 1, 1997

[54] LIQUID HEATING APPARATUS

[75] Inventor: James Henry Sharples, Radcliffe, United Kingdom

[73] Assignee: Pifco Limited, Manchester, England

[21] Appl. No.: 498,942

[22] Filed: Jul. 6, 1995

[30] Foreign Application Priority Data

Jul. 7, 1994 [GB] United Kingdom ............... 9413661

[51] Int. Cl.$^6$ .................................................. F24D 1/00
[52] U.S. Cl. ........................ 126/369; 126/344; 126/390; 219/441
[58] Field of Search ........................ 126/369, 344, 126/367, 373, 378, 275 E, 390; 219/441, 437

[56] References Cited

U.S. PATENT DOCUMENTS 4,375,028  2/1983  Wood ........................ 219/441
4,422,442  12/1983  Gutmann et al. ........................ 126/390
5,269,217  12/1993  Goad ........................ 126/369 X

*Primary Examiner*—Larry Jones
*Attorney, Agent, or Firm*—Harrison & Egbert

[57] ABSTRACT

A heating apparatus for a liquid includes a vessel (1) having a base and a side walls (2, 3), and a planar electrical element (5) integrated in the base wall (2). In order to render the apparatus efficient when only a small quantity liquid is to be heated, the base wall (2) of the vessel (1) surrounding the element (5) is inclined towards the element (5) so that the liquid retained in the vessel (1) is directed on to the element (5). Preferably, the portion of the base wall (2) of the vessel (1) surrounding the element includes a lip (9) whereby the element (5) is stepped downwardly from the base wall (2) to form a well whereby a small quantity of liquid is retained either in direct contact with or directly above the element (5). The angle ($\alpha$) of inclination of the base wall (2) of the vessel (1) to the element (5) is preferably at least 5°.

8 Claims, 1 Drawing Sheet

LIQUID HEATING APPARATUS

TECHNICAL FIELD

The present invention relates to liquid heating apparatus incorporating an electrical element and in particular but not exclusively to water heating apparatus such as an electric kettle.

BACKGROUND ART

Conventionally, an electric kettle comprises a vessel in a lower portion of which an electrical element is located. The element and accompanying electrical control circuitry are usually mounted on a side or base wall of the vessel. Typically the element passes through an aperture in the side wall and projects into the vessel. Suitable sealing means are used to ensure a water tight joint between the element and the wall of the vessel to prevent leakage of water in use.

A disadvantage of such an arrangement is that it is not possible to heat a small quantity of water, such as a single cupful, efficiently because an air gap may be left between the upper surface of the water and the element above it. In addition, it is also essential if a sheathed coiled wire electrical element is used that the element is completely covered by water to prevent the element from overheating in use.

Similarly, even in kettles fitted with planar elements which are incorporated into the base of the vessel, it is usual to provide a channel around the periphery of the element in which water remains after the element has been switched off by a safety switch. This again renders the kettle inefficient when only small quantities of heated water are required because more water must be heated than is actually required for use.

It is an object of the present invention to provide a liquid heating apparatus which overcomes or substantially mitigates the aforementioned disadvantage.

SUMMARY OF THIS INVENTION

According to the present invention there is provided a heating apparatus for a liquid comprising a vessel having a base and a side walls and a planar electrical element integrated in the base wall of the vessel, wherein the base wall of the vessel surrounding the element is inclined towards the element so that any liquid retained in the vessel is directed on to the element.

Preferably, the portion of the base wall of the vessel surrounding the element comprises a lip whereby the element is stepped downwardly from the base wall to form a well in which liquid can be retained in direct contact with the element.

Preferably also, the angle of inclination of the base wall of the vessel to the element is at least 5°.

Preferably also, the heating apparatus comprises a kettle with its base and a side walls made of a plastics material.

DETAILED DESCRIPTION OF THE INVENTION

Figure 1:
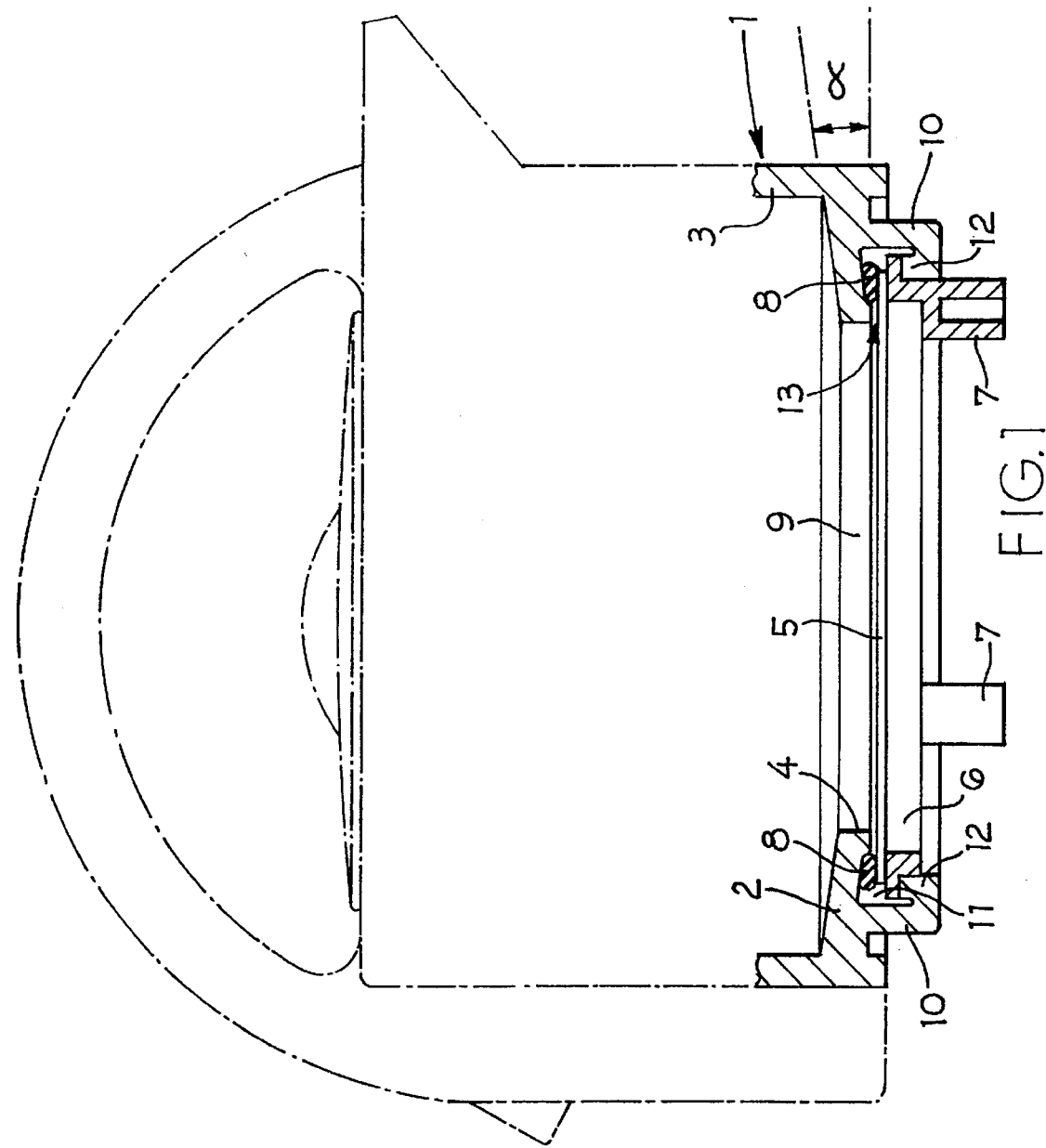
FIG. 1 is a vertical cross-sectional illustration of a lower portion of a liquid heating apparatus in accordance with the present invention.

The present invention will now be described by way of example with reference to the accompanying drawing which is a vertical cross-section of a lower portion of a liquid heating apparatus, such as an electric kettle.

An apparatus for heating liquids, such as a domestic kettle as is shown above the main cross-section in the drawing in dashed lines, comprises a vessel 1 having a base wall 2 and a side wall 3. The base wall 2 defines an aperture 4 which is covered by a planar electrical element 5 that is integrated into the body of the vessel 1 to make it entire and capable of being used for heating liquids.

The element 5 is preferably of a thick film printed circuit type wherein a thick film resistive track has been applied to the surface of a substrate that comprises a metal plate. The element 5 is held in place by a securing means in the form of an annulus 6. The annular form of the securing means enables an air space to be left below the element 5 to insulate other components of the heating apparatus from the element 5. In addition to its retaining function, the annulus 6 serves to stiffen the base wall 2 of the kettle which supports the element 5. The annulus 6 is also provided with mounting posts 7 for the attachment of a base cover (not shown) to the vessel 1.

A sealing means 8 is also used in the securement of the element 5 to the vessel 1 to ensure a water-tight joint. The sealing means 8 is located around the periphery of the element 5 and can comprise a pre-formed strip or ring of the correct dimensions or be formed in situ from a liquid, paste or foam.

The base of the vessel 1 defining the aperture 4 is shaped so as to provide a downwardly projecting lip 9 around the periphery of the aperture 4 and a longer downwardly projecting collar 10 between which is located the sealing means 8. An air gap 11 is left between the outer edge of the element 5 and the inner surface of the collar 10. This gap 11 permits the element 5 to expand in use without touching the vessel 1.

The element 5 is centered on the aperture 4 to lie covering the sealing means 8 without touching the base or side walls 2, 3 of the vessel 1. The annulus 6 lies in contact with the element 5 on the other side to the sealing means 8 and exterior to the vessel 1. The element 5 and the annulus 6 are held in position, with the sealing means 8 under compression, by a turned over portion 12 of the collar 10 which is produced by heat forming. Preferably the sealing means 8 is compressed by between 30% and 40% of its original diameter to ensure a water- and air-tight joint.

A small air gap 13 is also left between the surface of the element 5 and the downwardly projecting lip 9.

Thus, the element 5 is clamped in position between the sealing means 8 and the annulus 6 to form a integral part of the body of vessel 1 but without actually touching the vessel 1 at any point. This is important if the vessel 1 is made of a plastics material such as polypropylene which is incapable of withstanding normal operating temperatures of the element 5.

If the present invention is for use in a water boiling apparatus such as a domestic kettle, then the vessel 1 is typically made from polypropylene or a common metal and the normal operating temperature of the element will be in the range up to 120° C. with adverse temperatures significantly higher in the event of the kettle being operated without water or boiling dry. In these circumstances, the sealing means 8 can comprise silicone rubber, which will insulate and protect the body of the vessel 1 from the heat of the element 5 up to around 250° C. Likewise, the annulus is preferably made of nylon, metal, or a thermoplastics material which will withstand the normal operating temperatures of the element 5 and, up to predetermined level, adverse temperatures too.

In order to enable the apparatus to be used for heating small quantities of liquid, instead of making the base wall 2 flat to lie horizontal is use, the base wall 2 surrounding the element 5 is inclined and made to slope towards the element 5. In this way, any liquid within the apparatus is thereby directed on to the element 5. Thus, if it is desired to heat only a small quantity of liquid, the efficiency of the apparatus is improved over that of an apparatus with a substantially horizontal base wall because a greater proportion of the liquid water will lie directly on the element 5 and not be trapped at the sides of the vessel.

The angle α of inclination of the base wall 2 of the vessel 1 to the element 5 is arranged to be at least 5° and is preferably in the range 5° to 10° inclusive. In addition, it will be appreciated that the lip 9 provided on the base wall 2 steps the element 5 downwards from the base wall 2 to form a well at the bottom of the vessel. This increases the capacity for retention of small quantities of water indirect contact with and directly above the element 5 to improve the efficiency of the apparatus.

Thus, the invention provides a means whereby the efficiency of a heating apparatus, such as a kettle, with a planar element, such as an element of a thick film printed circuit type, integrated in the body of the apparatus is improved over both a similar apparatus not exhibiting the invention features and an apparatus incorporating a conventional sheathed coiled wire element.

However, it will be appreciated that the present invention can be used in connection with any heating apparatus used for heating liquids and not only in connection with water heating apparatus such as kettles. In addition, any suitable planar electrical element can be used in connection with the invention and not only one of a thick film printed circuit type.

What is claimed is:

1. A heating apparatus for a liquid comprising:
    a vessel having a base wall and a side wall;
    a planar electrical heating element secured to the base wall to form an integral part of a liquid-retaining lower portion of the vessel; and
    a sealing means affixed around a periphery of said heating element for insulating the base wall from said heating element, said base wall of the vessel surrounds the heating element and is inclined toward the heating element such that any liquid retained in the vessel is directed onto the heating element.

2. The apparatus as claimed in claim 1, wherein said base wall has an angle of inclination to the heating element of at least 5°.

3. The apparatus as claimed in claim 2, wherein the angle of inclination of the base wall of the vessel to the element is in the range 5° to 10° inclusive.

4. The apparatus as claimed in claim 1, further comprising a securing means connected to the vessel so as to be in contact with the heating element on an opposite side from the sealing means, said securing means for clamping the heating element onto the base wall of the vessel.

5. The apparatus as claimed in claim 4, wherein an air gap is defined between the heating element and the base wall of the vessel such that the heating element is not in direct contact with the vessel.

6. The apparatus as claimed in claim 1, said vessel being a kettle, the base wall and the side wall being of a polymeric material.

7. The apparatus as claimed in claim 1, wherein the heating element comprises a substitute supporting a thick film resistive track.

8. The apparatus as claimed in claim 1, wherein said base wall comprises a lip surrounding said heating element, said heating element being stepped downwardly from said base wall so as to form a well in which liquid can be retained in direct contact with said heating element.

* * * * *